UNITED STATES PATENT OFFICE.

FRANZ SCHOLL, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

BLACK DISAZO DYESTUFFS AND PROCESS OF MAKING SAME.

1,029,639.   Specification of Letters Patent.   Patented June 18, 1912.

No Drawing.   Application filed September 20, 1911. Serial No. 650,323.

*To all whom it may concern:*

Be it known that I, FRANZ SCHOLL, Ph. D., chemist, a citizen of the Empire of Germany, residing at Höchst-on-the-Main, Germany, have invented certain new and useful Improvements in Black Disazo Dyestuffs and Processes of Making Same, of which the following is a specification.

I have found that valuable black basic disazo dyestuffs are obtained by diazotizing trimethylammoniumphenyl-azo-m-toluidin and causing it to act upon heteronuclear α-α-aminooxynaphthalenes. These new dyestuffs are black powders, readily soluble in water with a reddish-violet color, soluble in alcohol, insoluble in ether, benzene and ligroin, and are particularly valuable for the dyeing of artificial silk.

The following example illustrates my invention: 34 kg. of hydrochlorid of trimethylammonium-phenyl-azo-m-toluidin are dissolved in about 1500 liters of water and diazotized with 24 kg. of hydrochloric acid (19° Bé.) and 6.9 kg. of sodium nitrite. This diazo solution is run into a cooled solution of 16 kg. of 1.8-amino-naphthol in 12 kg. of hydrochloric acid (19° Bé.) and about 600 liters of water. After having stirred this mixture for a good time it is heated to about 50° C. and salted out by adding a solution of common salt. When dry the dyestuff forms a black powder readily soluble in water with a reddish-violet color which turns red on addition of a mineral acid and greenish-blue on addition of ammonia, soluble in concentrated sulfuric acid with a greenish-blue, and in alcohol with a blue color, insoluble in ether, benzene and ligroin, which dyes artificial silk a beautiful greenish-black tint. Instead of the 1-amino-8-oxynaphthalene there may be used the 1-amino-5-oxynaphthalene.

Having now described my invention, what I claim is:

1. As new products, the basic disazo dyestuffs of the constitution:

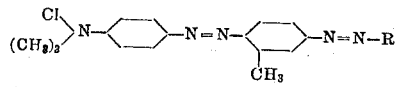

wherein "R" stands for a heteronuclear aminooxynaphthalene, being black powders, readily soluble in water with a reddish-violet color, soluble in alcohol, insoluble in ether, benzene and ligroin, dyeing artificial silk black tints.

2. As a new product, the basic disazo dyestuff of the constitution:

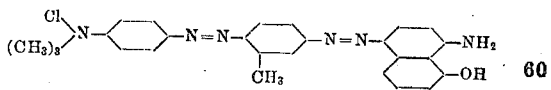

being a black powder, readily soluble in water with a reddish-violet color which turns red on addition of a mineral acid and greenish-blue on addition of ammonia, soluble in concentrated sulfuric acid with a greenish-blue, and in alcohol with a blue color, insoluble in ether, benzene and ligroin, dyeing artificial silk a greenish-black tint.

3. The process of manufacturing basic disazo dyestuffs which consists in diazotizing trimethylammoniumphenyl-azo-m-toluidin and causing it to act upon heteronuclear α-α-amino-oxy-naphthalenes.

In testimony whereof, I affix my signature in presence of two witnesses.

FRANZ SCHOLL.

Witnesses:
 JEAN GRUND,
 CARL GRUND.